(12) United States Patent
Naik et al.

(10) Patent No.: US 10,009,349 B2
(45) Date of Patent: Jun. 26, 2018

(54) LICENSE MANAGEMENT SYSTEM

(71) Applicant: Infinera Corp., Annapolis Junction, MD (US)

(72) Inventors: Dharmendra Naik, San Jose, CA (US); Lam Dinh Hoang, San Jose, CA (US); Kiran Kumar Dintakurthi, Fremont, CA (US); Kasi Viswanadham Pydi, Karnataka (IN); Kamalakannan Govindarajan, Basaweshwara Nagar (IN); Rajasekar Venkatesan, Saratoga, CA (US)

(73) Assignee: Infinera Corporation, Sunnyvale, CA (US)

(*) Notice: Subject to any disclaimer, the term of this patent is extended or adjusted under 35 U.S.C. 154(b) by 0 days. days.

(21) Appl. No.: 15/496,904

(22) Filed: Apr. 25, 2017

(65) Prior Publication Data

US 2017/0230371 A1 Aug. 10, 2017

Related U.S. Application Data

(62) Division of application No. 14/041,362, filed on Sep. 30, 2013, now Pat. No. 9,648,020.

(51) Int. Cl.
*H04L 29/06* (2006.01)
*G06F 21/10* (2013.01)
*G06F 21/12* (2013.01)

(52) U.S. Cl.
CPC .......... *H04L 63/10* (2013.01); *G06F 21/105* (2013.01); *G06F 21/121* (2013.01); *H04L 29/06* (2013.01); *G06F 21/10* (2013.01); *G06F 2221/0773* (2013.01)

(58) Field of Classification Search
CPC ....... G06F 21/10; G06F 21/105; H04L 63/10; H04L 63/102
USPC .............................................................. 726/30
See application file for complete search history.

(56) References Cited

U.S. PATENT DOCUMENTS

| | | | |
|---|---|---|---|
| 5,204,897 A | 4/1993 | Wyman | |
| 5,884,024 A | 3/1999 | Lim et al. | |
| 6,920,567 B1 | 7/2005 | Doherty et al. | |
| 2002/0100037 A1 | 4/2002 | Kitagaw | |
| 2005/0589072 | 12/2005 | Sabharwal | |
| 2006/0248017 A1* | 11/2006 | Koka | G06F 21/105 705/59 |
| 2007/0168294 A1* | 7/2007 | Tsurukawa | G06F 21/10 705/59 |
| 2009/0299791 A1* | 12/2009 | Blake | G06Q 10/06 705/40 |
| 2012/0239660 A1* | 9/2012 | Patel | G06F 21/121 707/741 |
| 2014/0380499 A1* | 12/2014 | Pruss | G06F 21/62 726/27 |

* cited by examiner

*Primary Examiner* — Syed Zaidi
(74) *Attorney, Agent, or Firm* — David L. Soltz

(57) ABSTRACT

In the disclosed method, a current state of a network device indicative of no license key being associated with a network device is stored in a license database. Information indicative of a master state of the network device is received, via an input port, including at least one license key associated with the network device. The current state of the network device is updated to include the at least one license key associated with the network device, and the updated current state is stored in the license database.

6 Claims, 6 Drawing Sheets

LICENSE MANAGEMENT SYSTEM

CROSS-REFERENCE TO RELATED APPLICATIONS

The present patent application is a divisional of the patent application identified by U.S. Ser. No. 14/041,362, filed Sep. 30, 2013, now U.S. Pat. No. 9,648,020, the entire content of which is hereby incorporated herein by reference.

FIELD OF THE DISCLOSURE

The disclosure generally relates to a license management system and method to allow network operators and vendors to efficiently and accurately manage license configurations for network devices movable between network elements in the network as network devices are moved in the network.

BACKGROUND

Communication networks, such as computer networks, cable networks, satellite networks, cellular networks, local area networks, wireless networks, the Internet, virtual private networks, metropolitan networks, public switched telephone networks, and optical networks are becoming increasingly important in carrying ever-increasing amounts of data between users, computer systems, and/or databases worldwide. Networks generally include multiple network elements (e.g., network nodes) with various network devices (e.g., line modules, photonic integrated chips) deployed on each network element. The network elements are dispersed geographically and are coupled to one another in compliance with one or more of many networking protocols, standards, and infrastructures, which specify how signals and\or data may be exchanged between network elements in the same network and/or between network elements in different networks. Examples of network protocols and infrastructures include Ethernet, TCP/IP, WDM, DWDM, and WLAN.

Multiple network operators such as internet service providers, cable network operators, mobile phone operators, search engine companies, social network companies, internet hosting companies, and cloud storage companies, for example, build, maintain, and operate a variety of networks and/or provide networking services to users or businesses. Network operators generally purchase and deploy a variety of network elements (NE or NEs), such as network nodes, gateways, and servers to provide networking services to their customers. Further, network operators purchase and deploy a variety of network devices (ND or NDs) on each of the network elements, such as line modules, optical line modules, interconnects, bridges, amplifiers, cables, optical fibers, splitters, and other hardware and/or software components and devices.

Some network elements include processors executing software and/or firmware, and are provided to network operators under the terms of a license agreement as licensable hardware or licensed network elements. Similarly, some network devices deployed on various network elements may likewise be subject to licensing agreements, and one or more license keys may be tied to or associated with a particular network device and a particular location (e.g., a particular network element) where the network device is deployed.

Network operators activate license keys on network elements and/or network devices before the respective network elements and/or network devices can be used in their respective networks. For example, as network operators activate a newly implemented network device on a network element or reactivate a previously deactivated network device from a network element, network operators may communicate activating a license key to the appropriate vendor in some way, such as by visiting the vendor's website, or by calling the vendor's customer service representatives. Similarly, when network operators remove or otherwise deactivate a network device from a network element, network operators may communicate deactivating the license key for the removed or deactivated network device to the appropriate vendor.

To enable network operators to activate and deactivate license keys and to allow vendors to keep track of and manage the license configurations of network elements and network devices sold to network operators and/or activated on a network operator's network, a license store and/or a master database may be maintained by vendors and may include license configurations (e.g., license keys and/or locations) for the network elements and network devices provided to network operators by the vendor. Network operators likewise may use a local license manager and/or may maintain a local license database to manage the license configurations of the network elements and network devices on their network. The local license database of the license manager may be synchronized with the master database of the license store (e.g., periodically or continuously), as desired, to ensure proper billing by vendors and compliance with applicable license agreements by network operators.

During normal network operations, network operators reconfigure NEs and NDs, such as by physically moving NDs between different NEs in the network, activating new NDs on various NEs in the network, deactivating NDs from various NEs in network, and/or temporarily storing deactivated NDs in a spare depot. For example, each time a ND is stored in a spare depot, the network operator may remove or deactivate the license key(s) active on the ND and may return or check in the license key(s) back in the license store. Subsequently, if the network operator relocates the ND to a different NE and attempts to activate the ND, the network operator may not realize a license key associated with the particular ND is located in the license store, and may erroneously purchase a new license key for the ND instead of reactivating the existing license key associated with the ND. This may cause network operators to underutilize purchased license keys and/or to unnecessarily purchase additional license keys for network devices.

SUMMARY

In one aspect, the inventive concepts disclosed herein are directed to a license management system having a processor capable of executing processor-executable code coupled with a non-transitory processor-readable medium storing a master license database and processor-executable code for causing the processor to: (1) store a master state of a network device indicative of a license key associated with the network device in the master license database; (2) access information indicative of a license key request for the network device subsequent to the storing of the master state, the license key request including a current state of the network device; (3) compare the master state of the network device with the current state of the network device; and (4) in response to the master state differing from the current state of the network device, generate an error message and store the error message in non-transitory processor-readable medium.

In a further aspect, the inventive concepts disclosed herein are directed to a license management system having a processor capable of executing processor-executable code coupled with a non-transitory processor-readable medium storing a license database and processor-executable code for causing the processor to: (1) store a current state of a network device indicative of no license key being associated with the network device in the license database; (2) receive, via an input port, information indicative of a master state of the network device including a license key associated with the network device; (3) update the current state of the network device to include the license key associated with the network device; and (4) store the updated current state in the license database.

In yet another aspect, the inventive concepts disclosed herein are directed to a method for managing a license configuration of a network device, comprising: (1) accessing, by a processor, a license key request for the network device indicative of a current state of the network device including information indicative of no license key being associated with the networking device; (2) accessing, by the processor, a master state of the network device indicative of a license key associated with the network device stored in non-transitory processor-readable medium; (3) generating, by the processor, an error message indicative of the license key associated with the network device; and (4) outputting, by the processor, the error message via an output port.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION OF EXEMPLARY EMBODIMENTS

Figure 1:
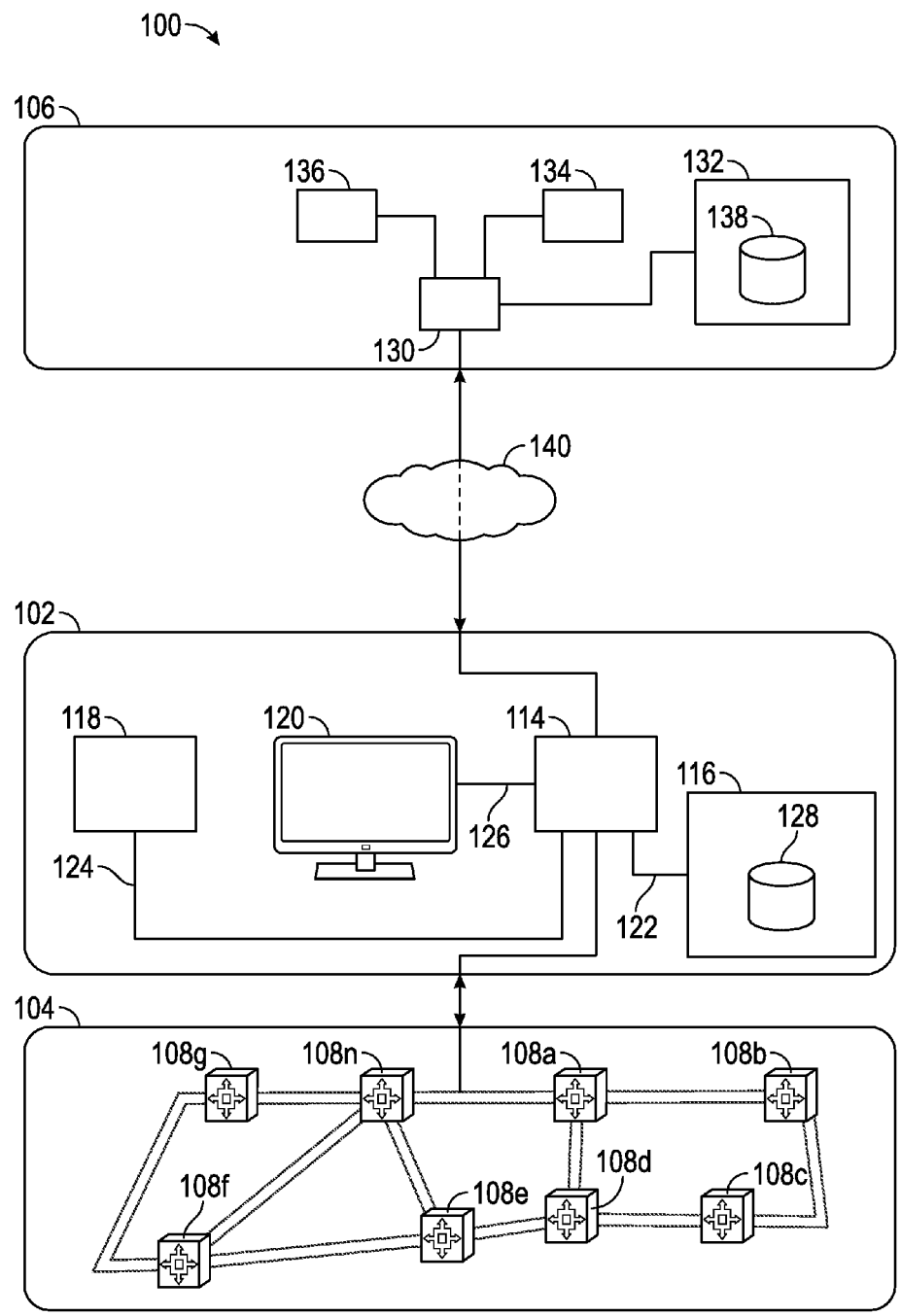
FIG. 1 is a diagram of an exemplary embodiment of a license management system according to the inventive concepts disclosed herein.

The following detailed description refers to the accompanying drawings. The same reference numbers in different drawings may identify the same or similar elements or features.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

As used herein, "network element," "network elements," "NE," or "NEs" is intended to include software, firmware, and/or hardware network devices, components, or elements that may be provided to a network operator under the terms of a license agreement by a vendor, and that may be configured to enable and/or disable one or more functions, features, and/or network devices, based on one or more license keys being added or activated on the licensed network device and/or removed or deactivated from the licensed networking device. Each of the NEs may have a unique location in a network.

As used herein, "network device," "network devices," "ND," or "NDs" is intended to include software, firmware, and/or hardware network devices such as optical line modules or photonic integrated chips configured to be plugged in or otherwise deployed on a NE, and which are provided to a network operator under the terms of a license agreement by a vendor and are configured to enable and/or disable one or more functions or features based on one or more license keys being added or activated on the ND and/or removed or deactivated from the ND.

As used herein "licensing operation" includes the adding or activation of a license key on a ND and/or a NE and/or the removing or deactivation of a license key from a ND and/or a NE.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the instant disclosure are not necessarily all referring to the same embodiment.

The inventive concepts disclosed herein are directed to license management systems and methods to enable vendors and network operators to efficiently manage the license configurations (e.g., activation, deactivation, and transfer of license keys) of NDs as NDs are activated, deactivated, stored, and moved between various NEs in the network.

Figure 2:
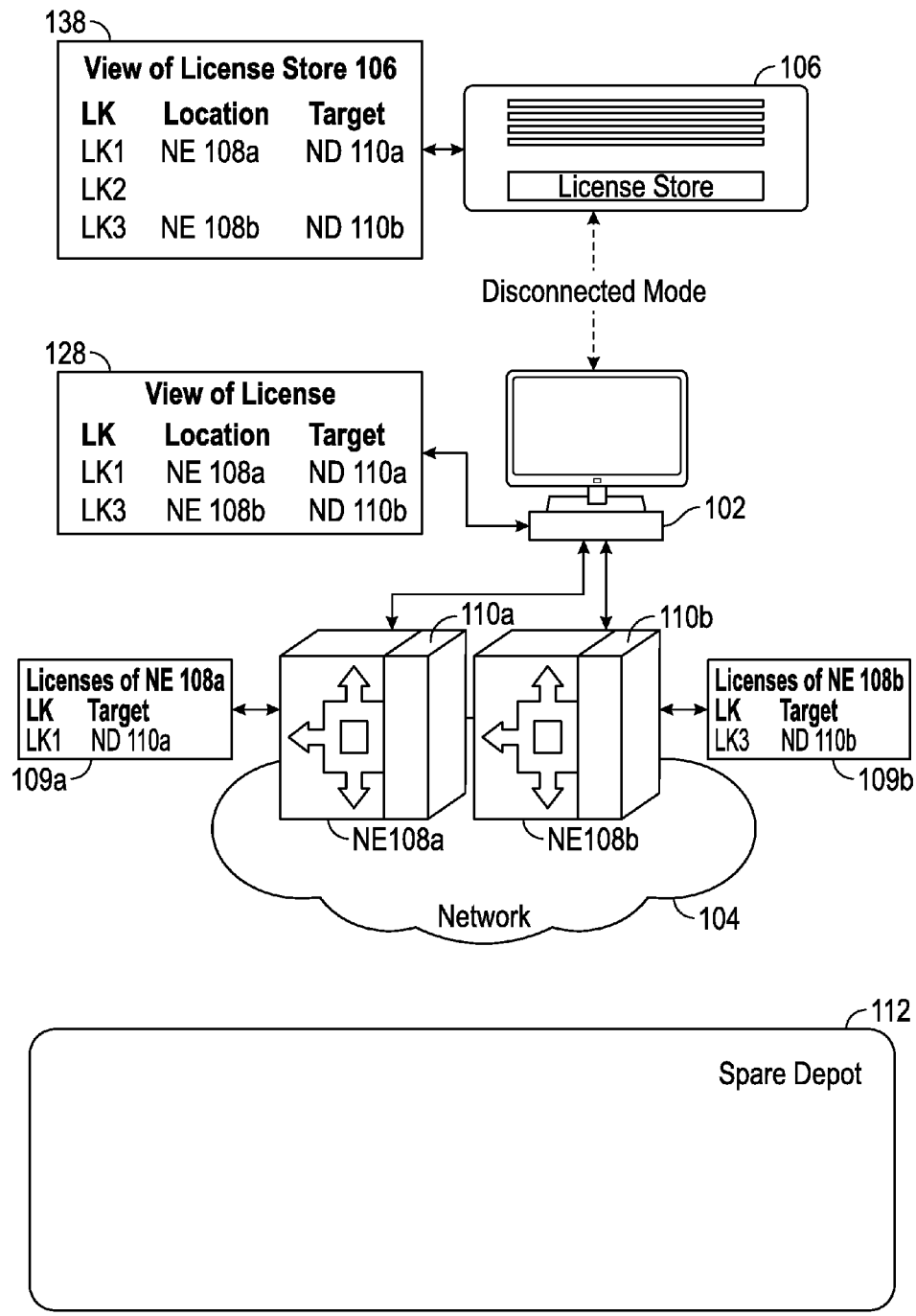
FIG. 2 is a diagram of an exemplary embodiment of a license management system according to the inventive concepts disclosed herein operating in a disconnected mode.

Referring now to the drawings, and in particular to FIGS. 1-2, shown therein is an exemplary embodiment of a license management system 100 according to the inventive concepts disclosed herein. The license management system 100 may include a license manager 102 coupled with a network 104, and a license store 106. In some embodiments, the license store 106 may be deployed on the premises and/or may be under the control of a vendor of one or more NEs 108a-n and/or one or more NDs 110a-n, and/or the license manager 102 may be deployed on the premises and/or may be under the control of a network operator of the network 104.

The network 104 may include a plurality of NEs 108a-n coupled with one another so that data and/or signals may be bi-directionally exchanged by the NEs 108a-n. The plurality of NEs 108a-n may include one or more NDs 110a-n deployed thereon. The network 104 may be an optical network, a cable network, a hybrid fiber-coaxial network, a wireless network, or combinations thereof, for example, and may be constructed in compliance with any desired networking infrastructure and/or protocols such as wave division multiplexing or TCP/IP, for example.

The NEs 108a-n may be implemented as network nodes, for example, and each NE 108a-n may have a known location in the network 104 (e.g., a geographical location and/or a chassis location or identification). The NEs 108a-n may include at least one processor coupled with a non-transitory processor-readable medium 109 which may store processor-executable code and/or data such as a license configuration database for the respective NE 108a-n and/or NDs 110a-n deployed thereon.

The NDs 110a-n may be implemented as optical line modules, optical interconnects, photonic integrated chips, or any other desired network devices. One or more NDs 110a-n may be deployed on each NE 108a-n (e.g., by being plugged in or connected to the NE 108a-n), and/or may be disconnected or removed from the NEs 108a-n and stored in a spare depot 112 (FIG. 2).

The license manager 102 may be implemented as a computer system or a server coupled with the network 104, and may or may not be physically co-located with the network 104. The license manager 102 may include at least one processor 114 coupled with a non-transitory processor-readable medium 116, an input device 118, and an output device 120, all of which can be partially or completely network-based or cloud-based, and may not necessarily be located in a single physical location.

The processor 114 can be implemented as a single or multiple processors working together to execute processor executable code including the logic described herein and may be implemented as a digital signal processor (DSP), a central processing unit (CPU), a field programmable gate array (FPGA), a microprocessor, a multi-core processor, and combinations thereof. The processor 114 is operably coupled with the non-transitory processor-readable medium 116 via a path 122 which can be implemented as a data bus allowing bi-directional communication between the processor 114 and the non-transitory processor-readable medium 116.

The processor 114 is capable of communicating with the input device 118 and with the output device 120 via paths 124 and 126 (e.g., one or more data busses). The processor 114 is capable of reading and/or executing processor executable code stored in the one or more non-transitory processor-readable medium 116 and/or of creating, manipulating, altering, and storing computer data structures into the non-transitory processor-readable medium 116.

The non-transitory processor-readable medium 116 may store data and processor-executable code and may be implemented as non-transitory computer memory, such as random access memory (RAM), a CD-ROM, a hard drive, a solid state drive, a flash drive, a memory card, a DVD-ROM, a floppy disk, an optical drive, and combinations thereof, for example. The non-transitory processor-readable medium 116 may be implemented as a "cloud memory" e.g., two or more non-transitory processor-readable mediums 116 which are partially, or completely based on or accessed using a network such as the network 104, for example. Further, the processor 114 may not communicate directly with the non-transitory processor-readable medium 116, but may communicate with another processor 114 communicating with the non-transitory processor-readable medium 116 over a network such as the network 104, for example.

In some exemplary embodiments, the non-transitory processor-readable medium 116 may store a license database 128 indicative of license configurations for the NDs 110a-n deployed on each of the NEs 108a-n managed by the license manager 102 (e.g., at least one license key activated on or otherwise associated with the respective ND 110a-n deployed on the NE 108a-n and/or a location of the ND 110a-n in the network 104). License configuration data in the license database 128 may be stored as data structures or data tables and may be time-stamped in some exemplary embodiments of the inventive concepts disclosed herein as will be described below.

In some embodiments the license database 128 may be implemented as a separate database stored in non-transitory processor-readable medium separate from the non-transitory processor-readable medium 116 and accessible by the processor 114 over a computer network.

The input device 118 may pass data to the processor 114, and may be implemented as a keyboard, a mouse, a touchscreen, a camera, a cellular phone, a tablet, a smart phone, a PDA, a microphone, a network adapter, a computer port, an Ethernet port, a wireless port, an input port, a CD-drive, a USB-port, and combinations thereof, for example. The input device 118 may be located in the same physical location as the license manager 102, or may be remotely located and/or partially or completely network-based.

The output device 120 may pass data from the processor 114 to a user (e.g., a network operator), such that the information is in a form that can be perceived by the user. For example, the output device 120 can be implemented as a server, a computer monitor, a cell phone, a smartphone, a tablet, a speaker, a website, a personal digital assistant, a fax, an output port, a printer, a projector, a laptop monitor, and combinations thereof. The term "pass" as used herein may refer to either push technology, or to pull technology, and to combinations thereof. The output device 120 can be physically co-located with the license manager 102, or can be located remotely from the license manager 102, and may be partially or completely network based (e.g., a website). The term "user" is not limited to a human, and may include a human, a computer, a host system, a smart phone, a tablet, and combinations thereof, for example.

The license store 106 may include at least one processor 130 coupled with a non-transitory processor-readable medium 132, an input device 134, and an output device 136.

The processor 130 may be implemented and may function similarly to the processor 114.

The non-transitory processor-readable medium 132 may be implemented similarly to the non-transitory processor-readable medium 116 and may store a master database 138 indicative of master license configurations or master states of one or more NDs 110a-n deployed on one or more NEs 108a-n in the network 104 (e.g., including one or more license keys associated with each ND 110a-n and/or a location in the network 104 associated with the NDs 110a-n such as an identification of the NE 108a-n on which the NDs 110a-n are deployed), for example.

The input device 134 may be implemented and may function similarly to the input device 118, and the output device 136 may be implemented and may function similarly to the output device 120, for example. In some exemplary embodiments, the output device 136 may be coupled with the input device 118 such that data may be bi-directionally exchanged between the processor 114 and the processor 130, the processor 114 and the non-transitory processor-readable medium 132, the processor 130 and the non-transitory processor-readable medium 116, and combinations thereof, as will be described below.

In some embodiments, as shown in FIG. 1, the license management system 100 may operate in a connected mode where the processor 130 and the processor 114 are coupled or connected with one another over a computer network 140 (e.g., the Internet) so that the processor 130 and the processor 112 bi-directionally exchange one or more signals and/or data via one or more computer ports over the computer network 140 to automatically synchronize data in the master database 138 and the license database 128 in real-time or substantially in real-time.

In some embodiments, as shown in FIG. 2, the license management system 100 may operate in a disconnected mode, where the processor 130 and the processor 114 work together to manually synchronize the data in the master database 138 and the license database 128. This can be accomplished by a user exporting a file (e.g., indicative of the current license configuration or state of the NDs 110a-n) from the license database 128, and importing the file into the master database 138, such as by logging onto a website provided by the license store 106 (e.g., using the computer network 140 and/or a secure networking protocol such as SSL or HTTPs, or via a virtual private network or tunnel). Further, in some embodiments where the license management system 100 operates in the disconnected mode, a portable non-transitory processor-readable medium (not shown), such as a CD-ROM, a flash-drive, a memory stick, a solid-state drive, or a hard-drive, may be implemented to transfer license configuration data and/or processor-executable instructions between the processor 114 and/or 130 and/or the non-transitory processor-readable mediums 116 and/or 132.

The master database 138 may include a master license configuration or master state of each of the NDs 110a-n having one or more license keys associated with each ND 110a-n, and/or a location (e.g., a NE 108a-n) where each of the NDs 110a-n are deployed in the network 104. In some cases, license keys in the master database 138 may be tied to, or otherwise associated (e.g., permanently or temporarily) with a particular ND 110a-n (e.g., by using a unique ND 110a-n identifier such as a MAC address, IP address, serial number, or combination thereof). Further, license keys and/or NDs 110a-n may be temporarily associated with a particular location in the network 104 (e.g., via a location identifier uniquely identifying a particular NE 108a-n where the respective ND 110a-n is deployed) to allow network operators to move NDs 110a-n between NEs 108a-n within the network 104. Further, license key information for each ND 110a-n may be associated with a particular network operator, for example.

In some exemplary embodiments where the license management system 100 operates in the disconnected mode, the license store 106 may detect a missing license key for a NE 110a-n based on a current state or current license configuration of the ND 110a provided to the license store 106 by the license manager 102, and may use a master state or master license configuration to download the missing license key for the ND 110a-n to the network 104. The license manager 102 may provide the missing license key to the appropriate ND 110a-n as will be described below.

As shown in FIG. 2, in one embodiment, a license key activation for a ND 110a on a NE 108a may be carried out by the license management system 100 operating in the disconnected mode as follows. The network operator may install or deploy a ND 110a on a NE 108a and a ND 110b on a NE 108b in the network 104. The license manager 102 may transmit one or more license key requests to the license store 106, or the processor 114 may generate one or more file(s) indicative of license key requests for the ND 110a and the ND 110b and/or including information indicative of the current state or current license configuration of the ND 110a and the ND 110b (e.g., any license key(s) associated with the NDs 110a and 110b and/or one or more NEs 108a and 108b where the NDs 110a and 110b are deployed in the network 104).

For example, license key requests may include information indicative of a current state or current license configuration for the ND 110a and the ND 110b which may uniquely identify the ND 110a and the ND 110b (e.g., ND identifier or ND ID), and a location ID uniquely identifying a location in the network 104 where the NDs 110a and 110b are located (e.g., by a NE 108a and 108b) and/or other pertinent information identifying the network operator and/or the network 104. In some embodiments, the ND ID for the NDs 110a and 110b may be MAC addresses, IP addresses, or any other suitable unique identifier uniquely identifying the NDs 110a and 110b, and the location ID may be a geographical location, or a NE 108a and NE 108b identification in the network 104 where the NDs 110a and 110b are located.

The license store 106 may receive the license key requests for the ND 110a and the ND 110b from the license manager 102 (e.g., via one or more files exported from the license manager 102 and imported into the license store 106), and may store the license key request and/or the current states or current license configurations for the ND 110a and the ND 110b in the non-transitory processor-readable medium 132.

In response to the license key requests, the license store 106 may generate one or more activation codes which may or may not be unique for the ND 110a and the ND 110b, and which may include license configurations or states having license keys (e.g., LK1 for the ND 110a and LK3 for the ND 110b), and/or the location IDs (e.g., the NE 108a for the ND 110a, and the NE 108b for the ND 110b) received with the respective license key requests, for example, to enable the NDs 110a and 110b and/or the NEs 108a and 108b to validate the respective activation codes as will be described below.

In some embodiments, the activation codes and/or the license configurations or states may omit one or more of: the license key (e.g., LK1 or LK3), the NE ID uniquely identifying the NDs 110a and 110b on which the license key is to be activated, and the location ID uniquely identifying the NEs 108a-n in the network 104 where the ND 110a and ND 110b are deployed or located. The license store 106 may transmit the activation code(s) to the appropriate license manager 102, such as by allowing a user to export one or more files indicative of the activation codes from the license store 106, which file may then be imported into the license manager 102 by the user.

In some embodiments, the license store 106 may store master states or license configurations of the ND 110a and the ND 110b in the master database 138, for example, indicative of license key(s) associated with the NDs 110a-b and/or locations of the NDs 110a-b in the network 104 (e.g., by NEs 108a-b). As shown in FIG. 2, the license store 106 may store the master state or master license configuration of the ND 110a as having LK1 associated therewith and as being deployed on the NE 108a (e.g., as LK1 {ND 110a; NE 108a}), and the master state or master license configuration of the ND 110b as having LK3 associated therewith and as being deployed on NE 108b (e.g., as LK3 {ND 110b; NE 108*b*}). The master database 138 may serve as the master database with which one or more license databases 128 are synchronized by users of one or more license managers 102 to ensure proper billing and license terms compliance by operators of the license managers 102, for example.

A user may import the file indicative of the activation code(s) in the license manager 102. The license manager 102 may store the activation codes in the non-transitory processor-readable medium 116 and may transmit one or more license configuration signals or commands (e.g., via the network 104) to the NEs 108*a* and 108*b* and/or to the NDs 110*a* and 110*b* indicative of the appropriate activation codes for the ND 110*a* (e.g., LK1 {ND 110*a*; NE 108*a*}) and for the ND 110*b* (e.g., LK3 {ND 110*b*; NE 108*b*}).

The NE 108*a* and/or the ND 110*a* may receive the respective activation codes from the license manager 102 and may validate the activation code (e.g., by decoding the activation code and determining whether the license key LK1 is valid, whether the ND ID correctly identifies the ND 110*a*, and/or whether the location ID correctly identifies the location of the ND 110*a* in the network 104, i.e., the NE 108*a* in this case). Similarly, the NE 108*b* and/or the ND 110*b* may receive the activation code from the license manager 102 and may validate the activation code (e.g., by decoding the activation code and determining whether the license key LK3 is valid, whether the ND ID correctly identifies the ND 110*b*, and/or whether the location ID correctly identifies the location of the ND 110*b* in the network 104, i.e., the NE 108*b* in this case).

In response to successfully validating the activation codes, the NEs 108*a* and 108*b* may update and store a local license configuration or local state for the NDs 110*a* and 110*b* (e.g., in the non-transitory processor-readable mediums 109*a* and 109*b*, respectively). For example, the NE 108*a* may store a local license configuration or local state for the ND 110*a* including the activated license key LK1 for the ND 110*a* deployed on the NE 108*a* (e.g., as LK1 {ND 110*a*; NE 108*a*}) in the non-transitory processor-readable medium 109*a*, and may activate or enable the ND 110*a* and/or one or more features on the NE 108*a*. Further, the NE 108*b* may store a local license configuration or local state for the ND 110*b*, including the activated license key LK3 for the ND 110*b* deployed on the NE 108*b* (e.g., as LK3 {ND 110*b*; NE 108*b*}) in the non-transitory processor-readable medium 109*b*, and may activate or enable the ND 110*b* and/or one or more features on the NE 108*b*. The NEs 108*a* and/or 108*b* may transmit one or more signals to the license manager 102 indicative of a successful validation of the license activation code and of the current states or current license configurations of the NDs 110*a* and/or 110*b*.

In some cases, the network operator may wish to remove or deactivate a ND 110*a-n* from a NE 108*a-n*, or may wish to deploy an additional ND 110*a-n* on a particular NE 108*a-n* and/or to activate an additional license key on a ND 110*a-n*. For example, to activate additional license key(s) on a particular ND 110*a-n* remaining on the same NE 108*a-n* and/or to add an additional ND 110*a-n* on the same NE 108*a-n*, the license manager 102 may repeat the above license activation steps one or more times.

Figure 3:
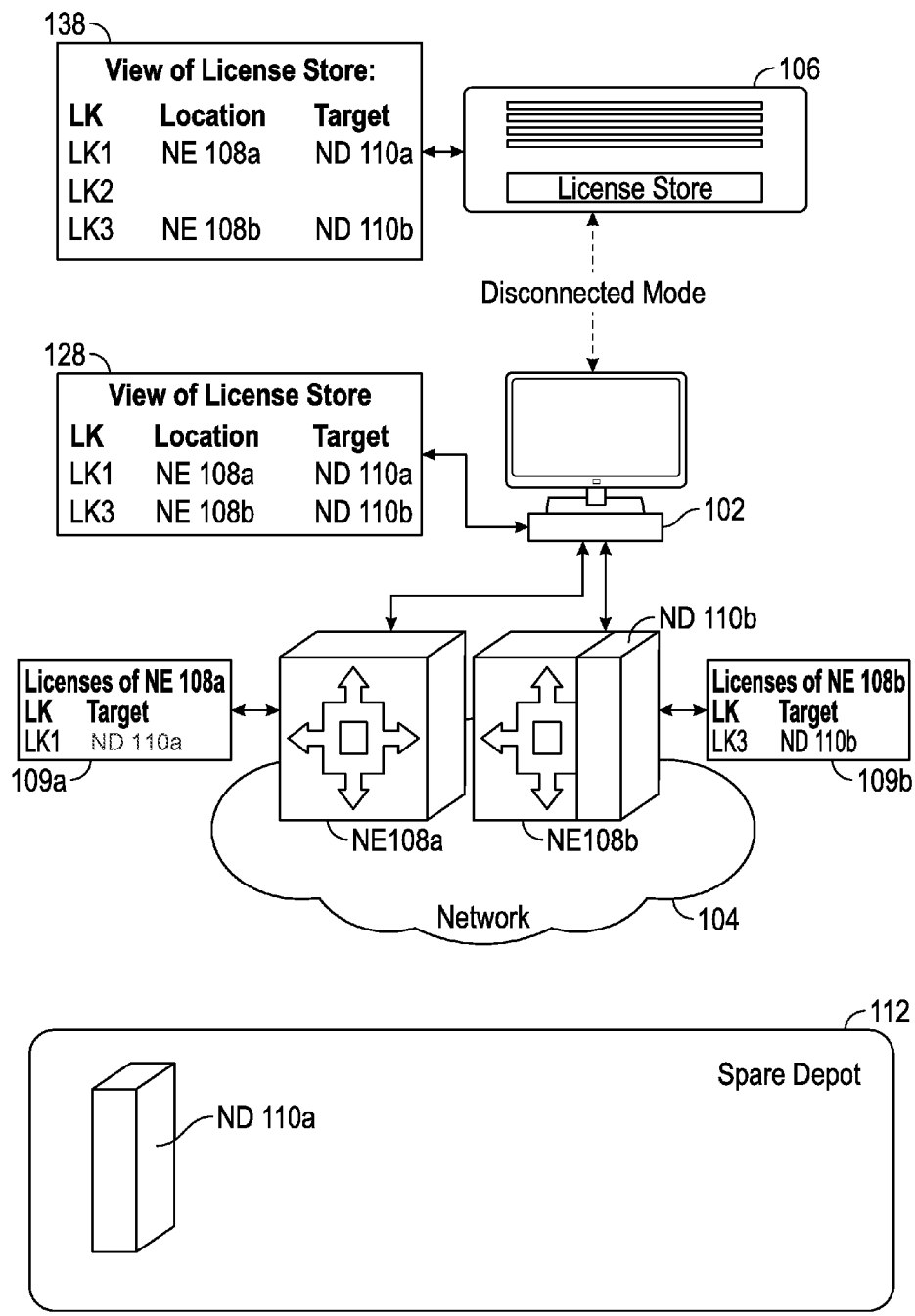
FIG. 3 is a diagram showing a network device removal from a network element according to the inventive concepts disclosed herein.
Figure 4:
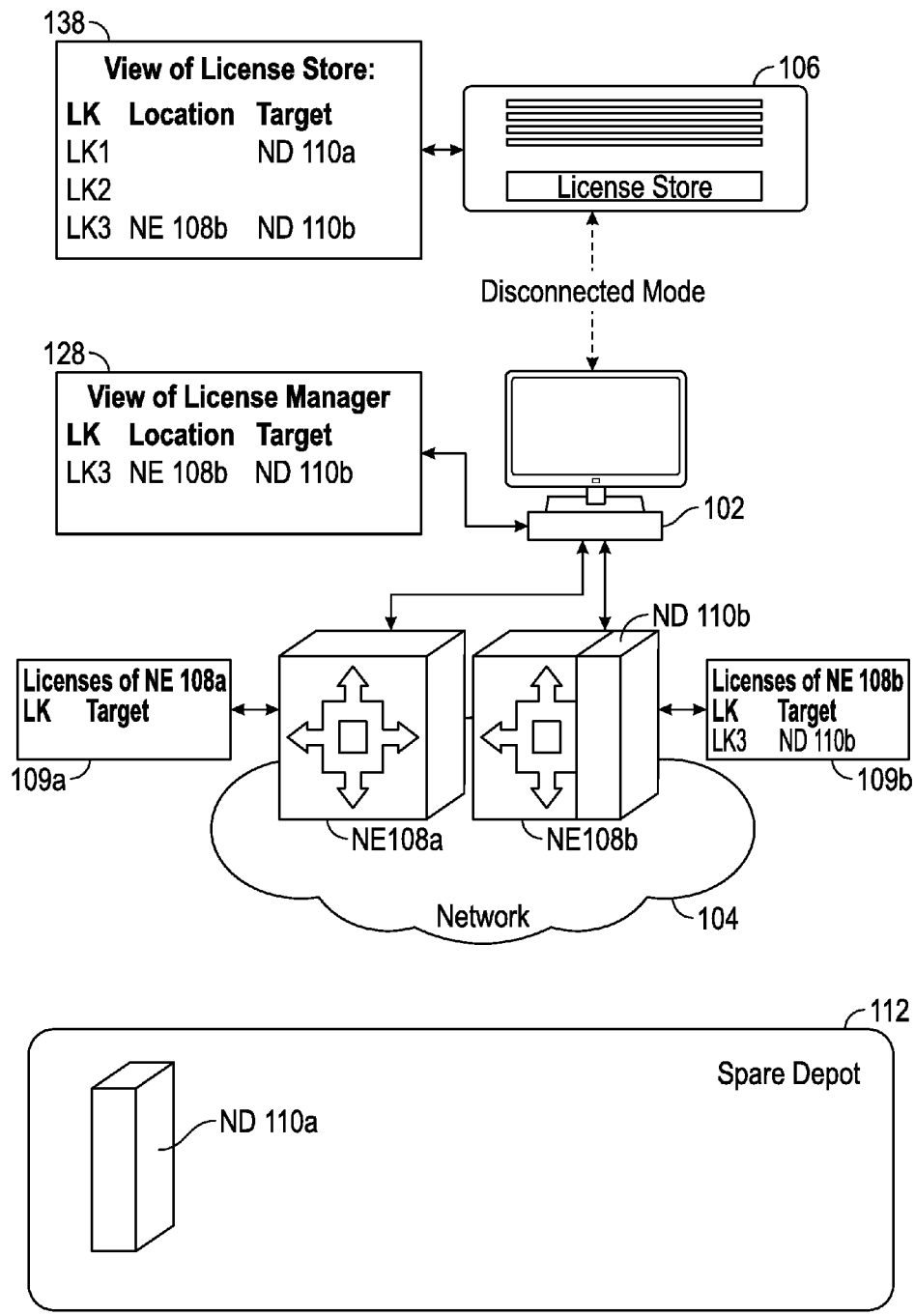
FIG. 4 is a diagram of an exemplary embodiment of a license configuration update carried out after a network device has been removed from a network element.

Referring now to FIGS. 3-4, in some exemplary embodiments the network operator may wish to remove a ND 110*a-n* from a NE 108*a-n*. For example, the operator of the network may wish to remove the ND 110*a* from the NE 108*a* and may store the ND 110*a* in the spare depot 112 as shown in FIG. 3.

The license manager 102 may send a license key removal message or signal to the respective NE 108*a* and/or ND 110*a*, The NE 108*a* and/or the ND 110*a* may update the local license configuration or local state for the ND 110*a* stored in the non-transitory processor readable medium 109*a* and/or 109*b* to reflect the removal of LK 1 and ND 110*a* from the NE 108*a* as shown in FIG. 4 (e.g., as _{ND 110*a*; _}). The license manager 102 may likewise update the current state or current license configuration of the ND 110*a* in the license database 128 to reflect the removal of the ND 110*a* and LK1 from the NE 108*a* (e.g., as _{ND 110*a*; _}). Further, where the license management system 100 operates in the disconnected mode, one or more files indicative of the current state or current license configuration of the ND 110*a* may be exported from the license manager 102 and imported into the license store 106 and may indicate that the ND 110*a* has been removed from the location NE 108*a*, for example.

Based on the imported file the license store 106 may update the master license configuration or master state of the ND 110*a* by removing the association between LK1 and the NE 108*a* (e.g., having an empty location ID or a null location ID such as LK1 {ND 110*a*; _}), while maintaining the association between LK1 and the ND 110*a*, and may update the master state or license configuration of the ND 110*a* in the master database 138 accordingly as shown in FIG. 4.

Figure 5:
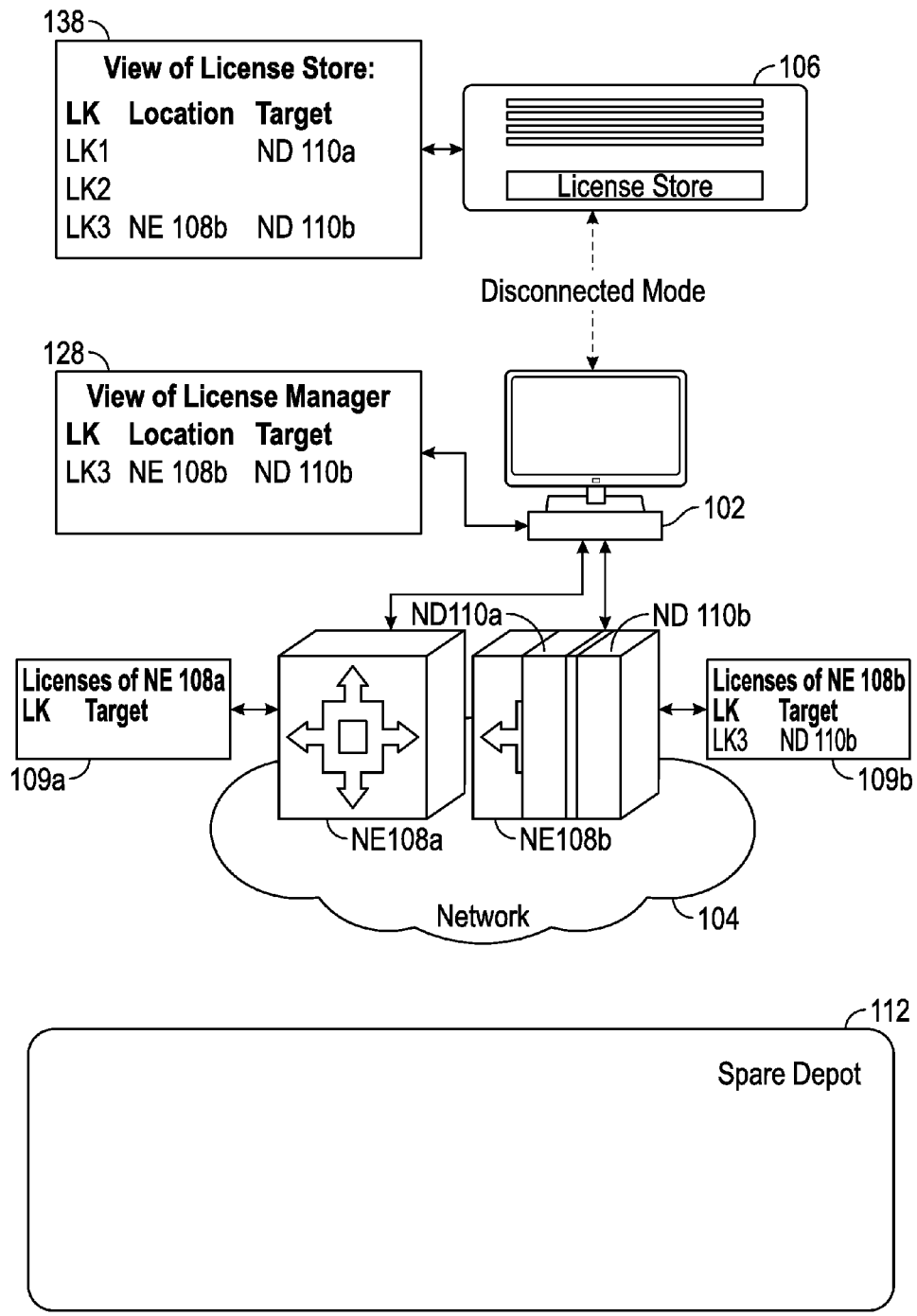
FIG. 5 is a diagram of an exemplary embodiment of the network device being moved from a spare depot and onto a network element according to the inventive concepts disclosed herein.
Figure 6:
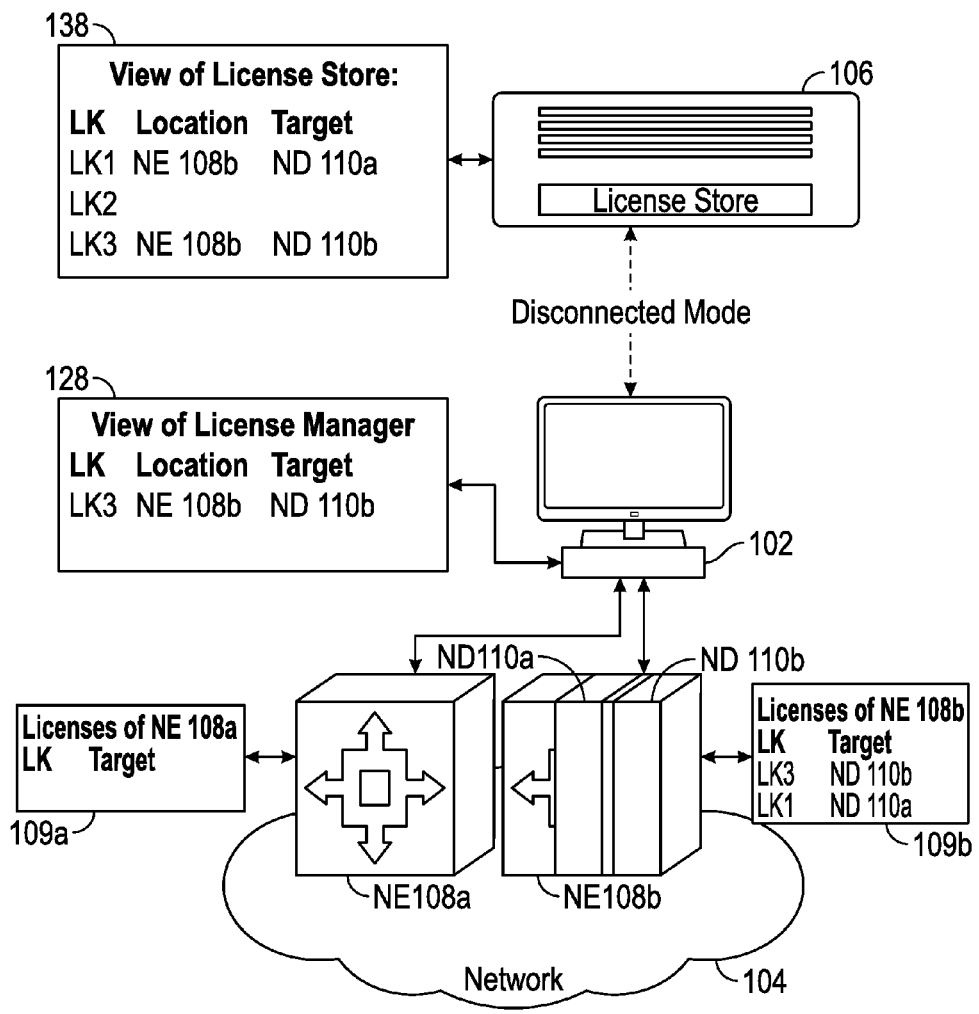
FIG. 6 is a diagram showing an exemplary embodiment of a license configuration update after a network device has been moved to a different network element according to the inventive concepts disclosed herein.

Referring now to FIG. 5, in some cases the network operator may wish to remove the ND 110*a* from the spare depot 112 and deploy the ND 110*a* on a different NE 108*a-n*, in this case on the NE 108*b*. Where the license management system 100 operates in the disconnected mode, as the network operator deploys the ND 110*a* on the NE 108*b*, the network operator may erroneously believe that a new license key (e.g., LK2) is needed for the ND 110*a*, based on the local state of the ND 110*a* stored in the license database 128 and visible to the license manager 102 indicating that no license key is associated with the ND 110*a*. Consequently, the network operator may cause the license manager 102 to export a file indicative of a license key request for the ND 110*a* and further including the current state (e.g., the current license configuration) of the ND 110*a* as stored in the license database 128 and a location ID identifying the location where the ND 110*a* is deployed (e.g., the NE 108*b*). In this case, the current state or current license configuration for the ND 110*a* stored in the license database 128 may be indicative of no licenses keys associated with the ND 110*a* and/or of a location ID (NE 108*b*) associated with the ND 110*a* by the license manager 102 (e.g., _{ND 110*a*; NE 108*b*}). The network operator may import the file in the license store 106.

The license store 106 may access information indicative of the license key request for the ND 110*a* on the NE 108*b* from the imported file and may compare the current state or current license configuration of the ND 110*a* included in the license key request (e.g., _{ND 110*a*; NE 108*b*}) with the master state or master license configuration of the ND 110*a* stored in the master database 138 (e.g., LK1 {ND 110*a*; _}) to determine if a discrepancy exists. For example, the license store 106 may determine that while the current state of the ND 110*a* included in the license key request indicates no license key is associated with the ND 110*a*, the master state of the ND 110*a* in the master database 138 indicates that LK1 is associated with the ND 110*a*. Further, the license store 106 may determine that the current state of the ND 110*a* indicates a location of NE 108*b* associated with the ND 110*a*, while the master database 138 indicates no location associated with the ND 110*a*.

In response to a discrepancy existing, the license store 106 may generate an error message including information indicative of the master state of the ND 110*a* stored in the master database 138 (e.g., indicative that LK1 is associated with the ND 110a) and/or including an activation code for LK1 on the ND 110a at the location of the NE 108b. The error message may be provided to the license manager 102, such as by exporting a file from the license store 106 and importing the file into the license manager 102, including information indicative of LK1 being associated with the ND 110a, for example, and/or including the activation code for the ND 110a located at the NE 108b.

The license manager 102 may access the error message and the master state of the ND 110a. In one embodiment, a network operator may wish to override the error message and activate LK1 and an additional LK2 on the ND 110a at the NE 108b, in which case, the license manager 102 may proceed to override the error message and may exchange one or more files with the license store 106 and/or with the NE 108b and/or the ND 110a to activate LK1 and LK2 on the ND 110a as described above, changing the current state or current license configuration and/or the master state or master license configuration of the ND 110a to (LK1, LK2 {ND 110a; NE 108b}), for example.

In some embodiments, the network operator may determine the license key request for the ND 110a was in error, and may assign LK1 to the ND 110a on the NE 108b, for example, by modifying the current state or license configuration to ND 110a to (LK1 {ND 110a; NE 108b}) by transmitting the activation code to the NE 108b and/or the ND 110a. One or more files indicative of the current state or current license configuration of the ND 110a may be exported from the license manager 102 and imported into the license store 106. The license store 106 may update the master state or license configuration of the ND 110a stored in the master database 138 accordingly to reflect that LK1 is activated on ND 110a and that ND 110a is located on the NE 108b, for example, and/or may generate an activation code to cause the NE 108b and/or the ND 110a to activate the LK1 on the ND 110 and to associate LK1 with the location of the NE 108b, as described above. Correspondingly, the license store 106 may update the master state of the ND 110a, and may store the updated master state in the master database 138.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that performs one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A license management system comprising at least one processor capable of executing processor-executable code coupled with a non-transitory processor-readable medium storing a license database and processor-executable code for causing the at least one processor to:
    store a current state of a network device indicative of no license key being associated with the network device in the license database;
    receive, via an input port, information indicative of a master state of the network device including at least one license key associated with the network device;
    update the current state of the network device to include the at least one license key associated with the network device, wherein the network device transmits optical signals on a fiber in accordance with the current state; and
    store the updated current state in the license database.

2. The license management system of claim 1, wherein the non-transitory processor-readable medium further stores processor-executable code for causing the at least one processor to:
    provide a license key request via an output port, the license key request indicative of no license key being associated with the network device and of a location identifier of a location of the network device in the network; and
    receive, via the input port, information indicative of an activation code for the network device, the activation code including the at least one license key associated with the network device, the location identifier, and an identifier of the network device.

3. The license management system of claim 2, wherein the non-transitory processor-readable medium further stores processor-executable code for causing the at least one processor to transmit the activation code to the network device via the output port.

4. A method, comprising:
    storing a current state of a network device indicative of no license key being associated with a network device in a license database;
    receiving, via an input port, information indicative of a master state of the network device including at least one license key associated with the network device;
    updating the current state of the network device to include the at least one license key associated with the network device, wherein the network device transmits optical signals on a fiber in accordance with the current state; and
    storing the updated current state in the license database.

5. The method of claim 4, further comprising: providing a license key request via an output port, the license key request indicative of no license key being associated with the network device and of a location identifier of a location of the network device in the network; and receiving, via the input port, information indicative of an activation code for the network device, the activation code including the at least one license key associated with the network device, the location identifier, and an identifier of the network device.

6. The method of claim 5, further comprising causing the at least one processor to transmit the activation code to the network device via the output port.

\* \* \* \* \*